284811 0599 --00 02-12-91 45376

01-10-91 160020 78147.0 04991810 1915

United States Patent [19]

[11] Patent Number: 4,991,810

[45] Date of Patent: Feb. 12, 1991

Andrus et al.

[54] ADJUSTABLE SUPPORT BASE FOR MOBILE VEHICLE HOIST

[75] Inventors: Terry A. Andrus, Oconomowoc; Robert D. Bartelt, Merton; William W. Belson, III, Nashota, all of Wis.; Michael R. Bruno, 3950 Southwood Dr., Oconomowoc, Wis. 53066; Scott M. Moen; Joseph A. Popelka, both of Oconomowoc, Wis.

[73] Assignee: Michael Roman Bruno, Oconomowoc, Wis.

[21] Appl. No.: 437,148

[22] Filed: Nov. 16, 1989

[51] Int. Cl.[5] .............................................. B60R 11/00

[52] U.S. Cl. ............................ 248/286; 224/42.45 R; 414/921

[58] Field of Search ............... 248/678, 285, 286, 287, 248/124; 224/42.45 R; 212/140, 189; 414/921, 540, 542, 543

[56] References Cited

U.S. PATENT DOCUMENTS

| | | | |
|---|---|---|---|
| 573,703 | 12/1896 | Robbins | 248/287 |
| 2,650,725 | 9/1953 | Hoyer | 414/921 |
| 4,573,854 | 3/1986 | McFarland | 414/921 |

*Primary Examiner*—David M. Purol
*Assistant Examiner*—Robert A. Olson
*Attorney, Agent, or Firm*—C. Thomas Sylke; Arnold J. Ericsen; Allan O. Maki

[57] ABSTRACT

An adjustable support base for portable vehicle mounted equipment includes a perpendicular pair of support legs adjustable relative to one another. Each leg is adjustable in length and anchorable to the vehicle on which the equipment is being mounted. A plate mounting system is angularly adjustable and secures the vehicle mounted equipment to the base provided by the support legs.

4 Claims, 2 Drawing Sheets

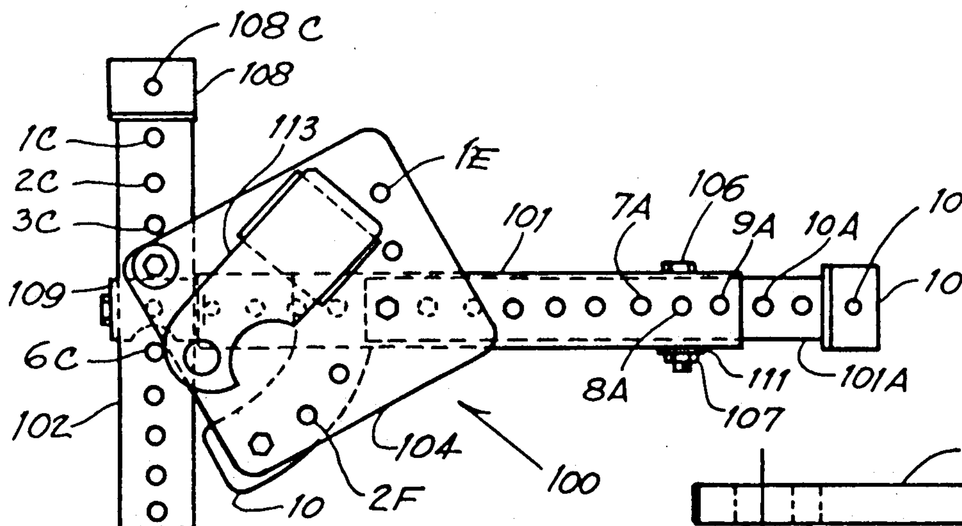
FIG. 2
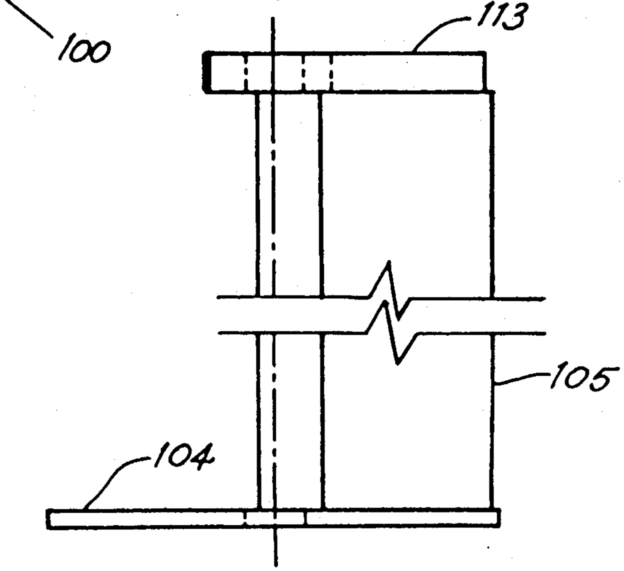
FIG. 6
| PAR TO PART | HOLE LOCATION FIG. 1 | HOLE LOCATION FIG. 2 |
|---|---|---|
| LEG 101 TO EXTENSION 101A | 2A | 8A |
| LEG 102 TO EXTENSION 102A | 9B | 3B |
| LEG 102 TO LEG 101 | 3C | 5C |
| LEG 102 TO PLATE 104 | 2C | 4C |
| LEG 101 TO PLATE 104 | 1E | 3E |
| PLATE 103 TO PLATE 104 | 1F | 3F |
FIG. 8

ADJUSTABLE SUPPORT BASE FOR MOBILE VEHICLE HOIST

BACKGROUND OF THE INVENTION

1. Field of the Invention

The present invention relates generally to mobile hoists attached to vehicles. More particularly, the present invention relates to an adjustable support base for a variety of mobile hoists such as those manufactured and sold by Bruno Independent Living Aids, Inc. of Oconomowoc, Wisconsin. The hoists are designed to be attached to a vehicle to assist handicapped or otherwise physically impaired individuals in lifting objects into or out of the vehicle.

2. Description of the Prior Art

In the past, mobile hoist support bases have had to be customized to fit a particular vehicle configuration. That is, each support base had to be individually tailored for the trunk or other interior features of a given vehicle model and body. This practice has required that well in excess of 100 different configurations and sizes of support bases be provided for the wide variety of vehicles available on the market. Such diversity in sizes and shapes has proven extremely troublesome to dealers who need to stock a variety of support bases and, at the time of installation, determine which of the over 100 models is appropriate for the given vehicle to be fitted with a mobile hoist.

The mobile hoists are particularly helpful to individuals who require wheelchair or other motive assistance devices due to age or other physical impairment or handicap. These hoists provide such individuals with greater independence in conducting their daily lives by reducing reliance on others for help with a needed wheelchair or powered cart.

A single support base design adaptable to various equipment and all vehicle types, bodies and frames would be a significant advancement in the art.

OBJECTS AND SUMMARY OF THE INVENTION

It is a primary object of the present invention to provide a simple and adjustable support base for a mobile hoist securable to a wide variety of vehicles.

It is another object of the present invention to provide an adjustable support base which is economical to manufacture and easy to install.

It is yet another object of the present invention to provide an adjustable support base which is capable of providing support to a variety of different types of mobile hoists and other vehicle mounted equipment.

How these and other objects of the present invention are accomplished will be explained in a detailed description of the preferred embodiment of the present invention in connection with the FIGURES. Generally, however, the objects are accomplished in an adjustable support base which includes a pair of support legs perpendicularly and adjustably mounted to one another. Each leg is adjustable in length and anchorable to a given vehicle. Preferably, the support legs can be anchored to the frame of the vehicle to provide an especially rigid and secure support base for vehicle mounted equipment such as a hoist. When mounted, the first and second legs define a plane. One or more mounting plates are secured to the support legs and form a plate mounting system which is parallel to the plane defined by the support legs. The mounting plate system is itself adjustable. Adjustment of the plate mounting system is rotational about an axis perpendicular to the defined plane. In the preferred embodiment, a three point attachment system is used with the plate mounting system and legs to ensure a secure and rigid platform on which to mount the hoist or other equipment. The hoist is typically pivotably secured to the mounting plate.

Other ways in which the objects are accomplished will become apparent to those presently of ordinary skill in the art after reviewing the specification.

DESCRIPTION OF THE DRAWINGS

FIG. 2 is a second preselected configuration of the preferred embodiment of the present invention.

FIG. 6 is a side plan view of the mounting plate and hoist mounting column of the present invention taken along the line 6—6' of FIG. 7.

FIG. 8 is an exemplary charting of data for the first and second preselected configurations of FIGS. 1 and 2.

In the FIGURES, like reference numerals refer to like components.

DESCRIPTION OF THE PREFERRED EMBODIMENT

Figures 1, 3, 4, 5, 7:
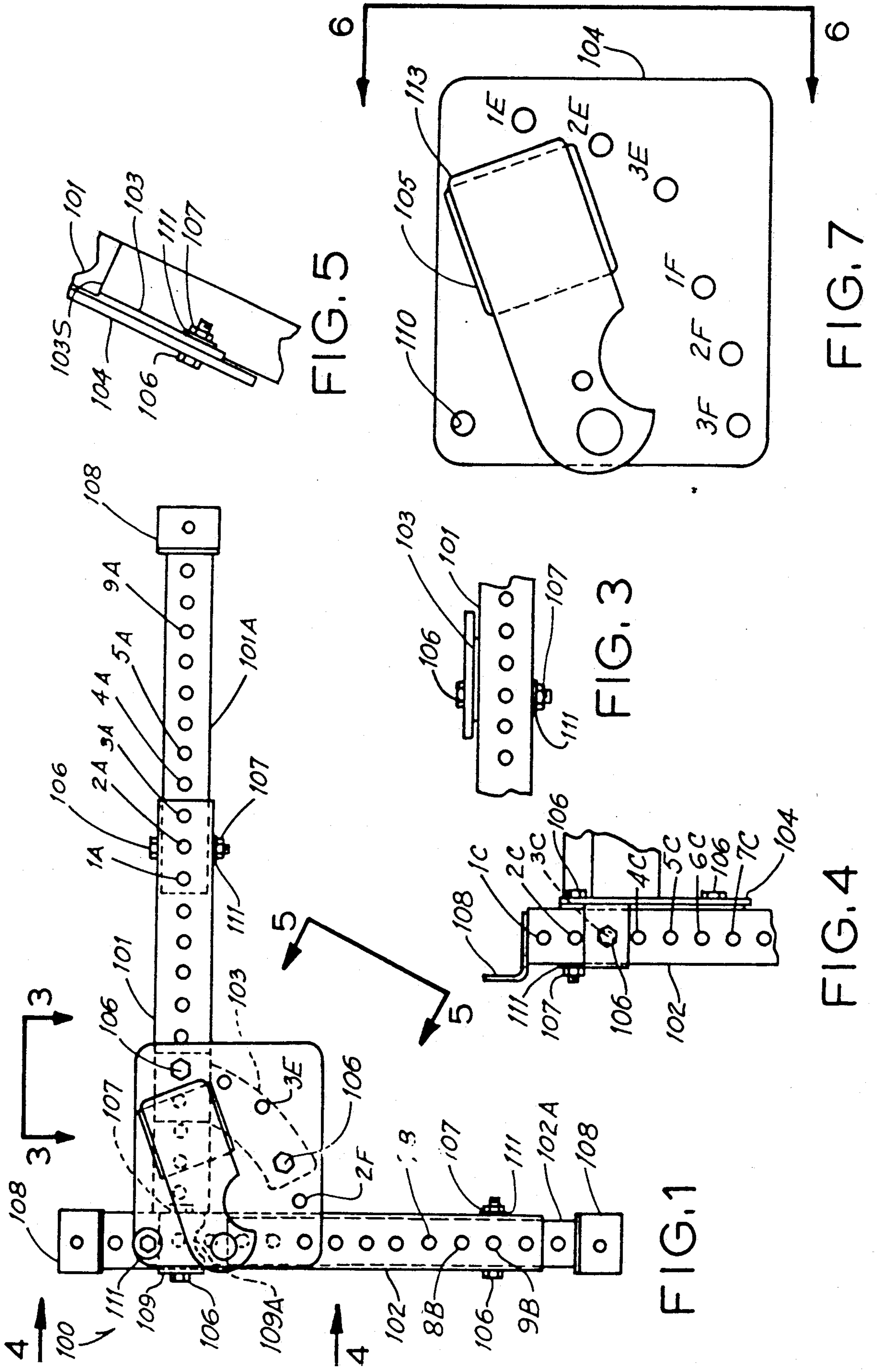
FIG. 1 is a first preselected configuration of the preferred embodiment of the present invention.
FIG. 3 is a side view of the portion of the embodiment of FIG. 1 taken along the line 3—3 of FIG. 1.
FIG. 4 is a side plan view of the configuration of FIG. 1 taken along the line 4—4 of FIG. 1.
FIG. 5 is a side plan view of the configuration of FIG. 1 taken along the line 5—5 of FIG. 1.
FIG. 7 is a top plan view of the column and mounting plates of FIG. 6.

The preferred embodiment of the present invention is shown in FIG. 1 in a first configuration for a given vehicle structure. FIG. 2 illustrates the preferred embodiment in a second configuration for a different vehicle structure.

In FIGS. 1 and 2, a support base 100 includes support legs 101, 102. The legs 101, 102 are attached to one another in a perpendicular orientation and define a plane. Mounted to support legs 101, 102 is a mounting plate 104. In the preferred embodiment a second, lower mounting plate 103 is included to improve stability and increase the variety of possible mounting positions available to the user of the support base 100. This will be explained in more detail below.

A column 105, shown in FIG. 6, is rigidly secured to the upper mounting plate 104 and provides the location at which the portable hoist is attached to the support base 100. As can be determined by one of ordinary skill in the art from the specification herein, a variety of types of vehicle mounted equipment can be mounted to the support plate 104 and be rigidly secured to a surface by the support base 100. The preferred embodiment will be described with reference to a portable hoist; however, the scope of the claims are in no way restricted thereby.

Legs 101, 102 are adjustable in length, having extension sections 101A, 102A, respectively, which are set depending on the mounting points to be used on a given vehicle. As can be seen in FIGS. 1 and 2, extension 101A can be secured using a bolt 106, nut 107 and washer 111 which are set in a preselected position on leg 101 and engage one of a number of holes (1A, 2A, 3A, 4A, ect. shown in FIG. 1) on extension 101A. Similarly, extension 102A may be set at a preselected position relative to leg 102 by selecting one of a number of holes (1B, 2B, 3B, etc. shown in FIG. 2) on extension 102A using a bolt 106, nut 107 and washer 111.

In FIG. 1, extension 101A is secured at hole 2A and extension 102A is secured at hole 9B. In FIG. 2, extension 101A is secured to leg 101 at point 8A and extension 102A is secured to leg 102 at point 3B. The relative position of leg 101 to leg 102 is determined by the point on leg 102 where leg 101 is secured. As seen in FIGS. 1 and 4, a bracket 109 is rigidly secured to leg 101 and is securable to leg 102 so as to not interfere with the plate mounting system. Using a bolt 106, captured nut 107 and washer 111, leg 101 can be secured to leg 102 at any of a number of point (1C, 2C, 3C, 4C, 5C, 6C, etc. shown in FIG. 4). In FIG. 1, leg 101 is mounted to leg 102 at point 5C.

The various combinations of leg positions utilizing holes 1A, 2A, 3A, etc.; 1B, 2B, 3B, etc.; and 1C, 2C, 3C, etc. allow a broad variety of relative positions for each of the vehicle mounting holes 108A, 108B and 108C (see FIG. 8). Each of these holes represents a point at which the support base 100 is mounted to a vehicle. Preferably, these points in the vehicle represent various positions on the vehicle frame where base 100 is secured. Mounting points 108A, 108B and 108C are located on L-shaped mounting brackets 108 at each end of leg 102 and at the free end of leg 101. Brackets 108 are secured to the vehicle by appropriate means such as a bolt and nut, or a rivet.

Main support plate 104, shown in FIG. 7, has a number of mounting holes in it as well. Corner hole 110 is mounted to leg 102 at any of a number of points (1C, 2C, 3C, etc. shown in FIGS. 1 and 2). Typically, hole 110 is mounted to leg 102 immediately adjacent bracket 109, as shown in FIGS. 1 and 2, so that legs 101 and 102 provide adequate support for whatever equipment is mounted to plate 104. Mounting of plate 104 to leg 102 is accomplished in the preferred embodiment using a bolt 106, nut 107 and washer 111. Bracket 109 may have appropriate indentations 109A in its lower surface to accommodate whatever means is used to mount plate 104 to leg 102.

In the preferred embodiment, plate 104 has two arcuately oriented sets of holes. The first set, consisting of holes 1E, 2E and 3E, enables plate 104 to be directly mounted to leg 101 at a preselected angular displacement relative to legs 101 and 102. In FIG. 1, hole 1E is used with a bolt 106, nut 107 and washer 111 to secure plate 104 to leg 101. In FIG, 2, hole 3E on plate 104 is used in a similar fashion to mount the plate 104 to leg 101.

Holes 1F, 2F and 3F further enhance the stability of the plate 104 as a support for any vehicle mounted equipment. In the preferred embodiment, a lower plate 103 provides a third point of attachment to the base created by legs 101 and 102. As seen in FIG. 1, when point 1E is secured to leg 101, point 1F is secured to lower plate 103 using appropriate means, such as a bolt 106, nut 107 and washer 111. In this configuration, plate 104 can optionally be secured at hole 3F to hole 7C on leg 102. As seen in FIG. 2, when point 3E is mounted to leg 101, lower plate 103 is bolted to point 3F.

Lower plate 103 is a formed crescent shaped bracket having a step 103S which is rigidly secured to leg 101 by sandwiching plate 103 between plate 104 and leg 101, seen in FIG. 5. Plate 103 therefore allows three point attachment between the equipment and the anchoring surface. Plate 103 is free to move with leg 101 as it is adjusted along the length of leg 102. Plate 103 also ensures column 105 has support immediately beneath it.

Other variations, modifications and other applications of the present invention will become apparent to those presently of ordinary skill in the art after reviewing the above specifications in connection with the FIGURES. Therefore, the above description of the preferred embodiment is to be interpreted as illustrative rather than limiting. The scope of the present invention is to be limited only by the scope of the claims which follow.

What is claimed is:

1. An adjustable support base for rigidly mounting a portable vehicle hoist to a surface, said support base comprising:

- first and second anchoring legs slidably and perpendicularly mounted to one another, each said leg being adjustable in length;
- wherein each end of said first leg has means for rigidly mounting said first leg to the surface, and wherein the first end of said second leg is slidably mounted to said first leg and the second end of said second leg has means for rigidly anchoring said second leg to the surface;
- further wherein said legs define a plane;
- a first rigid mounting plate rigidly secureable to each of said legs and parallel to said plane;
- wherein said first mounting plate is angularly adjustable and secureable while maintaining said parallel orientation to said plane; and
- an elongated support column rigidly attached to said first plate and extending generally perpendicular therefrom.

2. A support base according to claim 1 wherein said first plate is simultaneously attachable to both of said legs in a number of positions rotated from each other about an axis perpendicular to said defined plane.

3. A support base according to claim 2 wherein a second, reinforcing plate is positioned between said first plate and one of said legs.

4. A support base according to claim 1 wherein said plate is attached at three points to said leg.

* * * * *